US009043407B1

(12) United States Patent
Gaulke et al.

(10) Patent No.: US 9,043,407 B1
(45) Date of Patent: May 26, 2015

(54) INTERACTIVE USER INTERFACE TO COMMUNICATION-ENABLED BUSINESS PROCESS PLATFORMS METHOD AND APPARATUS

(75) Inventors: David Gaulke, Urbandale, IA (US); Dennis Kornbluh, Lincoln, NE (US)

(73) Assignee: Avaya Inc., Basking Ridge, NJ (US)

( * ) Notice: Subject to any disclaimer, the term of this patent is extended or adjusted under 35 U.S.C. 154(b) by 1467 days.

(21) Appl. No.: 12/483,851

(22) Filed: Jun. 12, 2009

(51) Int. Cl.
H04L 12/58 (2006.01)

(52) U.S. Cl.
CPC .......... *H04L 12/5835* (2013.01); *H04L 12/581* (2013.01)

(58) Field of Classification Search
CPC .... H04L 51/04; H04L 12/581; H04L 12/5835
USPC .......................................... 709/217, 204, 206
See application file for complete search history.

(56) References Cited

U.S. PATENT DOCUMENTS

| 5,892,909 | A | * | 4/1999 | Grasso et al. ................. 709/201 |
| 5,983,200 | A | * | 11/1999 | Slotznick .................... 705/26.43 |
| 6,604,090 | B1 | * | 8/2003 | Tackett et al. .................. 706/11 |
| 7,519,661 | B2 | * | 4/2009 | Slotznick ...................... 709/204 |
| 7,899,867 | B1 | * | 3/2011 | Sherstinsky et al. .......... 709/206 |
| 7,936,865 | B2 | * | 5/2011 | Brunson et al. .......... 379/215.01 |
| 8,041,770 | B1 | * | 10/2011 | Schmidt ........................ 709/206 |
| 8,060,565 | B1 | * | 11/2011 | Swartz ........................... 709/206 |
| 2001/0047356 | A1 | * | 11/2001 | Ren et al. .......................... 707/9 |
| 2001/0049617 | A1 | * | 12/2001 | Berenson et al. ................. 705/8 |
| 2001/0049722 | A1 | * | 12/2001 | Bush ............................. 709/204 |
| 2003/0182391 | A1 | * | 9/2003 | Leber et al. .................... 709/217 |
| 2003/0185232 | A1 | * | 10/2003 | Moore et al. .................. 370/465 |
| 2003/0220972 | A1 | * | 11/2003 | Montet et al. ................. 709/204 |
| 2006/0095522 | A1 | * | 5/2006 | Rang et al. .................... 709/206 |
| 2007/0121808 | A1 | * | 5/2007 | Brunson et al. ............. 379/67.1 |
| 2007/0244980 | A1 | * | 10/2007 | Baker et al. ................... 709/207 |
| 2007/0294229 | A1 | * | 12/2007 | Au ..................................... 707/3 |
| 2008/0147395 | A1 | * | 6/2008 | Da Palma et al. ............. 704/235 |
| 2008/0147406 | A1 | * | 6/2008 | Da Palma et al. ............. 704/260 |
| 2008/0147408 | A1 | * | 6/2008 | Da Palma et al. .......... 704/270.1 |
| 2008/0196099 | A1 | * | 8/2008 | Shastri ............................ 726/12 |
| 2008/0319751 | A1 | * | 12/2008 | Kennewick et al. .......... 704/257 |
| 2009/0100160 | A1 | * | 4/2009 | Bowerman .................... 709/223 |
| 2009/0117942 | A1 | * | 5/2009 | Boningue et al. ............. 455/564 |

(Continued)

OTHER PUBLICATIONS

"IM Bot Development Tools", available at http://web.archive.org/web/20080215005114/http://www.improvcenter.com/devTools.aspx, last updated Feb. 15, 2008, 2 pages.

(Continued)

*Primary Examiner* — Backhean Tiv
(74) *Attorney, Agent, or Firm* — Sheridan Ross P.C.

(57) ABSTRACT

An interactive chat-bot user interface to a communication-enabled business process (CEBP) application is provided. The user interface receives instant message commands from a user. The received instant message commands are parsed and transformed into commands formatted according to the application programming interface of the CEBP application. Feedback or other output from the CEBP application can be provided to the user by the interactive interface in an instant message. In addition, the interface can participate in a dialog with the user, all in the natural language of the user and using instant messages, in order to obtain the instructions and parameter information required by the CEBP application in order to perform a requested operation.

19 Claims, 3 Drawing Sheets

(56) References Cited

U.S. PATENT DOCUMENTS

| | | | | |
|---|---|---|---|---|
| 2009/0216848 A1* | 8/2009 | Slotznick | | 709/206 |
| 2009/0235084 A1* | 9/2009 | Ferraro et al. | | 713/182 |
| 2011/0107236 A1* | 5/2011 | Sambhar | | 715/753 |
| 2011/0153588 A1* | 6/2011 | Gartner et al. | | 707/709 |
| 2011/0270613 A1* | 11/2011 | Da Palma et al. | | 704/260 |
| 2012/0041903 A1* | 2/2012 | Beilby et al. | | 706/11 |

OTHER PUBLICATIONS

"Yahoo! Messenger Plug-in SDK", available at http://web.archive.org/web/20071229055425/http://developer.yahoo.com/messenger/, last updated Dec. 29, 2007, 1 page.

"imified", available at http://web.archive.org/web/20080208110708/http://www.imified.com/index.htm, last updated Feb. 8, 2008, 1 page.

"AIM Developer FAQs", available at http://dev.aol.com/aim/faqs#AIMBots, last updated Mar. 5, 2008, 3 pages.

"Skype Developer Docs", available at https://developer.skype.com/Docs/, last updated Apr. 28, 2009, 1 page.

"Google Talk for Developers", available at http://code.google.com/apis/talk/index.html, last updated Feb. 7, 2008, 1 page.

"JBuddy Bot Framework", available at http://www.zionsoftware.com/products/jbuddy/botframework/, last update unknown, 3 pages.

"Instant messenger and the power of command line interface", available at http://64.233.169.104/search?q=cache:secvwkeo8kYJ:vishalmanohar.wordpress.com/2008/04/29/instant-messenger-and-the-power-of-command-line-interface/+IM+%22command+line+interface%22+%22IM+Bot%22&hl=en&ct=clnk@cd=2&gl=us, last updated Apr. 29, 2008, 2 pages.

"Trends: New UI & Technology", available at http://www.byz.org/~rbanks/movableType/webLog/trends/archives/cat_5_new_ui_technology.html, last updated Apr. 6, 2006, 180 pages.

* cited by examiner

INTERACTIVE USER INTERFACE TO COMMUNICATION-ENABLED BUSINESS PROCESS PLATFORMS METHOD AND APPARATUS

FIELD OF THE INVENTION

Methods and apparatuses providing an interactive user interface to communication-enabled business process platforms are provided. In particular, a chat-bot is provided that acts as an interface to a communication enabled business process platform.

BACKGROUND

A number of enterprise Internet protocol telephony applications have been developed to facilitate communications using the Internet and other communication networks. For example, unified communications solutions provide a single launch point or portal for individual users to gain access to multiple communication applications. The solutions can include tools such as click to call, instant messaging, click to conference, and many others. Unified communications solutions focus primarily on maximizing the productivity of individuals in a work environment. Typically, unified communications solutions are delivered to market via packaged software offerings.

Other enterprise Internet protocol telephony software systems include communication-enabled business process (CEBP) platforms. A CEBP is different from unified communications in that it has not been feasible to deliver packaged CEBP offerings. In general, CEBP solutions proactively inject and coordinate communications events in the context of new or existing multi-person, multi-step business processes. Unlike unified communications solutions that enable individual users to execute non-correlated communications functions on an adhoc basis, CEBP processes specify an orchestrated series of communications events executed in a logical order. If the CEBP solution is well designed and well implemented, it can offer the potential to significantly reduce the human and system delay that slows an organization in successfully and productively completing an entire, mission critical business process. As work flow speed increases the responsiveness of an organization to business events can improve and the corporation's ability to survive and compete is enhanced.

By definition, a CEBP is a custom solution. In changing the focus from individual productivity enhancement to the efficiency of an entire business process, a CEBP must naturally be designed with unique requirements of each business in mind. Often, each enterprise will have a unique entry point for CEBP adoption based upon which business processes are core to their market and their process improvement and funding priorities. If implemented correctly, the issue of business efficiency can also be addressed by a CEBP.

Although CEBPs promise greater business flexibility and competitiveness, there has been great cost and complexity involved in designing, implementing and operating each custom CEBP solution. In particular, making powerful CEBP solutions accessible and useable by the corporate employees who will use the tools provided by such solutions has been a challenge. Accordingly, it would be desirable to make CEBP solutions more accessible to facilitate access to the value of CEBPs.

SUMMARY

In accordance with embodiments of the present invention, methods and apparatuses for providing a user interface to communication-enabled business process (CEBP) platforms are described. In particular, an interactive instant messaging (IM) "chat-bot" user interface is provided. The chat-bot user interface allows a user to interact with and control a CEBP platform using typed commands, without requiring the design and implementation of a fully formed and complete CEBP solution before implementing the CEBP infrastructure. Accordingly, the CEBP infrastructure can be made available to users in a basic and non-specific form.

In accordance with embodiments of the present invention, the chat-bot can provide text and/or media (e.g., audio, video) user interfaces so that scripts can be launched using a text based user interface (TUI), a graphical user interface (GUI), or both. In use, a chat session is initiated between the user and the chat-bot. The user and the chat-bot can then engage in an exchange of commands using a structured language sent as instant messages. Based on instructions provided by the user through the exchange, the operation of the CEBP platform can be controlled. Accordingly, the chat-bot provides a user interface for accessing, controlling, coordinating and building a CEBP platform.

In accordance with further embodiments of the present invention, the chat-bot may comprise an intelligent notification chat-bot that provides an evolving set of instant messaging accessible notification functions, with specific grammars for each language supported, to expose the features, functions, and processes of the CEBP platform. In addition, messages can be recorded and saved for later use.

Additional features and advantages of embodiments of the present invention will become more readily apparent from the following description, particularly when taken together with the accompanying drawings.

DETAILED DESCRIPTION

Figure 1:
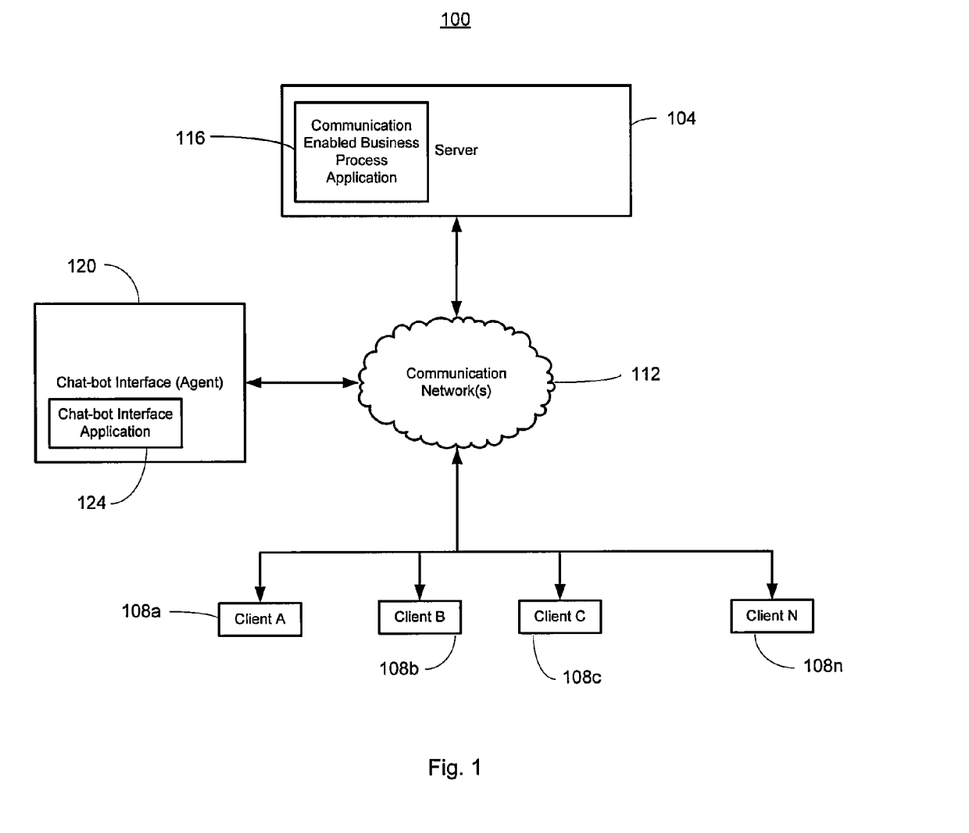
FIG. 1 depicts a communication arrangement that can incorporate a chat-bot interface to a communication-enabled business process platform in accordance with embodiments of the present invention.

FIG. 1 is a block diagram illustrating a system 100 that incorporates a chat-bot interface to a communication-enabled business process (CEBP) application or platform in accordance with embodiments of the present invention. The system 100 generally includes a server 104 interconnected to a plurality of client devices 108 by one or more communication networks 112. The system 100 additionally includes a chat-bot interface or agent 120 interconnected to the server 104 and the plurality of client devices 108 by the communication network 112. In addition, a CEBP application or platform 116 that can be executed by or in association with the server 104 is included in the system 100. The system 100 also can include a chat-bot interface application 124 that is executed by or in association with the chat-bot agent 120.

In general, the server 104 may comprise a communication server capable of running program instructions, including the CEBP platform 116. An example of a CEBP platform 116 that can be included in a system 100 in accordance with embodiments of the present invention is the communications process manager software solution available from Avaya Inc. In addition, the server 104 may implement or have access to a database for storing information regarding users and/or user contact addresses associated with an enterprise. In general, a CEBP platform 116 is capable of executing and orchestrating the communication activities required when an event in a business process requires contact with one or many individuals. These activities can include identifying the individuals who should receive a particular communication, and provides that communication to the identified individuals in realtime through any and all means available and/or appropriate (e.g., email, short message service (SMS), office phone, mobile phone, instant messaging, etc). Accordingly, the server 104 may comprise any device capable of running the CEBP application 116 and communicating with client devices 108 via the communication network 112.

The communication network or networks 112 could be any type of network, such as a wired network, a wireless network, a fiberoptic network, and the like. In addition, the communication network 112 may comprise a plurality of networks and/or a plurality of networks of different types.

The client devices 108 could be any device that can communicate over a communication network 112, such as a telephone, personal computer, cellular telephone, a personal digital assistant, and the like. Moreover, the plurality of client devices 108 may be the same as or different from one another. For example, client device A 108a could be a personal computer running a variety of programs, such as a telephony or video telephony communication application, an email application, an instant messaging application, and/or various other applications. As a further example, client device B 108b may comprise a telephone operated in combination with a personal computer at the direction of a common user. Client device C 108c could comprise a personal digital assistant implementing a wireless telephone and various applications, such as an email and/or SMS communication application. As still another example, client device N 108n may comprise a telephone or a text paging device. The foregoing examples of client devices 108 should not be considered limiting, and are instead provided for illustration purposes. In addition, although four client devices 108a-n are illustrated in FIG. 1, it should be appreciated that a system implementing or comprising a chat-bot interface in accordance with embodiments of the present invention is not limited to use in association with any particular number or type of client devices 108. Moreover, it should be appreciated that other topographies, including those in which the chat-bot interface 120 is executed by or incorporated into another device, such as the server 104 and/or one or more client devices 108, can be implemented.

Figure 2:
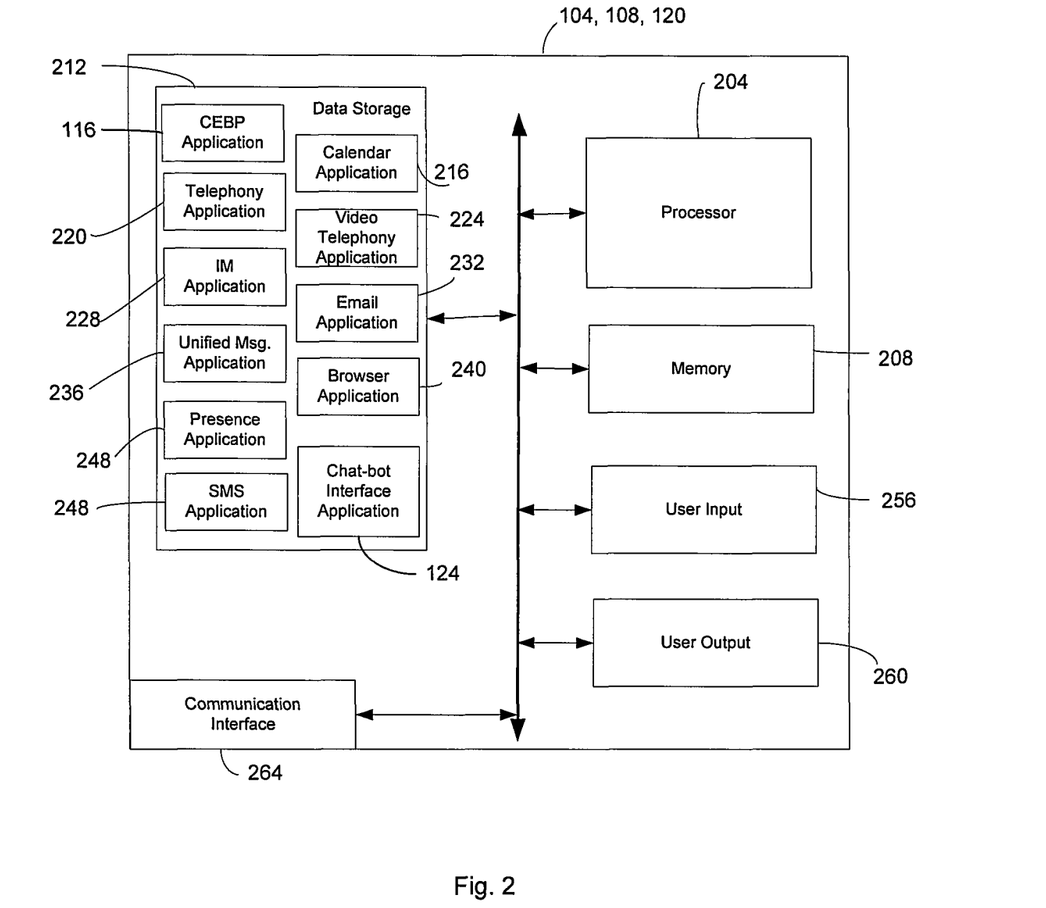
FIG. 2 is a block diagram depicting aspects of devices incorporating components of a system comprising a chat-bot interface to a communication-enabled business process platform in accordance with embodiments of the present invention.

FIG. 2 illustrates components of a server 104, client device 108, or agent implementing a chat-bot interface 120 in accordance with embodiments of the present invention. The components may include a processor 204 capable of executing program instructions or software. Accordingly, the processor 204 may include any general purpose programmable processor or controller for executing application programming or instructions. As a further example, the processor 204 may comprise a specially configured application specific integrated circuit (ASIC). The processor 204 generally functions to run programming code or instructions implementing the functions performed by the server 104, client device 108, or agent 120. As will be described in greater detail herein, such functions may include providing an interface to and control of a CEBP application 116 through the chat-bot interface application 124.

A server 104, client device 108 and/or agent 120 may additionally include memory 208 for use in connection with the execution of programming by the processor 204, and for the temporary or long term storage of program instructions and/or data. Alternatively or in addition, data storage 212 may be provided. In accordance with embodiments of the present invention, the data storage 212 may contain various applications that can be executed by the processor 204. In addition, the data storage 212 can contain data that is used and/or generated in connection with the execution of applications. Like the memory 208, the data storage 212 may comprise a solid state memory device. Alternatively or in addition, the data storage 212 may comprise a hard disk drive or other random access memory. In accordance with still other embodiments, the memory 208 may provide random access storage, while some or all of the data storage 212 may comprise read only storage.

Examples of application programming or instructions that can be stored in data storage 212 include the CEBP platform or application 116. Alternatively or in addition, other applications can be maintained in data storage 212. As can be appreciated by one of skill in the art, the particular application or set of applications maintained in data storage 212 will typically vary based on the identity of the device 104, 108 or 120 or the function being performed by the device 104, 108 or 120 in which the data storage 212 is incorporated. Other examples of applications that can be stored in data storage 212 include a calendar application 216, a telephony application 220, a video telephony application 224, an instant messaging application 228, an email application 232, a unified messaging application 236, a browser application 240, an SMS application 244, a presence application 248, and a chat-bot interface application 124.

A server 104, client device 108 or an agent 120 may also include one or more user input devices and one or more user output devices 260. However, it should be appreciated that a user input 256 and/or a user input 260 is not required to be supplied as part of or integral to a server 104 or agent 120. For example, a server 104 or agent 120 may be configured for access from another device, such as a client device 108 or an administrative device in communication with the server 104 or agent 120 over the communication network 112. In accordance with other embodiments, a server 104 and/or an agent 120 may be associated with a user input 256 and user output 260 for use by an administrator or a user interacting directly with the device 104 or 120.

A server 104, client device 108 and agent 120 also generally include one or more communication interfaces 264. For example, a packet data network interface, such as a wired or wireless Ethernet interface or cellular packet data interface may be provided, for instance to support Internet protocol communications over a communication network 112. Additional examples of communication network interfaces 256 include a telephony network interface or other wireless or wireline interfaces.

The CEBP application 116, as illustrated in FIG. 1, may be provided as part of a communication server 104. Alternatively, the CEBP application 116 may be executed by one or more client devices 108 alone or in combination with a communication server 104. According to still other embodiments, the CEBP application 116 may be executed by some or all of the server 104, client 108 and agent 120 devices. In general, the CEBP facilitates communications events in the context of new or existing multi-person, multi-step business processes.

More particularly, CEBP processes proactively inject and coordinate communications events in the context of new or existing multi-person, multi-step business processes. CEBP processes specify an orchestrated series of communications events executed in a logical order. Accordingly, a CEBP solution can significantly reduce the human and system delay that slows an organization in successfully and productively completing an entire, mission critical business process. The chat-bot interface provided by embodiments of the present invention makes CEBP solutions more accessible and useable.

The chat-bot interface, for example implemented through execution of a chat-bot interface application 124 running of an agent device 120 or other device (e.g., server 104 or client device 108), provides an interactive and user friendly interface to a CEBP application 116. More specifically, the chat-bot interface engages in a dialogue with the user and in turn the CEBP application 116. That is, the chat-bot interface acts as an intermediary. In addition, the chat-bot interface can provide a text and/or media user interface. In use, the user can provide a simple command, for instance by typing a command in accordance with a structured language or grammar using an instant messaging application 228. Accordingly, instant messaging can provide a channel for interacting with a CEBP application 116 that is provided by the chat-bot interface. The IM channel can then be used for all commands by the user, removing the need to enter commands in the language of the CEBP application 116. For example, a CEBP application such as the communications process manager software solution, may require that commands be provided in XML. The chat-bot interface parses dialogue provided via the instant messaging application 228 by the user and converts that dialogue to XML, before sending it to the CEBP application 116. Accordingly, the chat-bot interface provides a single control panel for the CEBP application 116. Moreover, the IM application 228, in cooperation with the chat-bot interface application 124, provides a single instant messaging channel that can be used to control multiple communication channels via the CEBP application 116. For instance, a single IM channel can be used to direct a CEBP application 116 to perform a notification operation involving numerous communication channels.

A particular example of a notification scenario can include entering or generating a list of individuals to be notified (i.e., provided with a particular message). Parameters of the notification can include the preferred channel by which recipients are notified and, the preferred time at which recipients are notified. For example, a preferred notification means could be email or instant messaging. As can be appreciated by one of skill in the art, the CEBP application 116 may operate in cooperation with a presence application 248 to determine the availability of an intended notification recipient. As a result, an alternate channel for notification can be selected if the preferred channel is not available, the recipient is not immediately available on the preferred channel, and/or the priority or importance of the notification. Moreover, the language preference may be determined and/or altered depending on the identity of particular notification recipients. The language of the notification can be determined according to user profile information for individual recipients stored, for example in the server 104 or on another device accessible to the server 104, for use in association with the CEBP application 116. The selections made by the user through the instant messaging dialogue with the chat-bot interface results in the creation of simple object access protocol (SOAP) XML commands that are provided to the CEBP application 116 by the chat-bot interface 120 in order to effect the notification commanded by the user.

Another example of a use of a CEBP application 116 in association with a chat-bot interface in accordance with embodiments of the present invention is a notify and response scenario. In particular, a notification sent to a recipient can prompt the recipient to respond. As an example, for a text based notification, such as an email, a button may be provided that allows the recipient to conveniently enter a response. As another example, where notification is via a voice channel, the recipient may be asked to press a number corresponding to a particular response. The CEBP application 116 can then listen for a dual-tone multiple frequency (DTMF) tone encoding the recipient's response. Responses collected from recipients can then be shipped back to the user or an administrator. In accordance with embodiments of the present invention, the response options presented to recipients can be set in response to text commands provided by the user to the chat-bot interface 120 as part of an instant messaging dialogue.

In accordance with further embodiments, the notify and conference scenario can be initiated through use of the chat-bot interface. In such a scenario, the notification may request that a recipient join a conference call. Where the recipient is notified over a voice channel, that recipient may be automatically joined to the call if a DTMF tone encoding acceptance by the recipient of the invitation is received. Where notification is provided through another channel, such as an email or instant message, that notification can include instructions to the recipient regarding how to join the conference.

With respect to these and other notification scenarios, or other operations that can be performed by a CEBP application 116, the chat-bot interface 120 can save a record of the SOAP XML instructions provided to the CEBP application 116 for later use as the basis of a subsequent notification or other operation.

The chat-bot interface application 124 comprises or is associated with a syntax that controls the commands available to a user and the responses to commands or inquiries received from the user. The chat-bot interface application 124 generally functions to provide a front end that interfaces with the user using natural (i.e., a human) language commands and responses. The chat-bot interface application 124 additionally provides a back end that uses SOAP XML commands to interact with the CEBP application 116. The effect is to allow the user to interact with and control the CEBP application 116 using simple, natural language commands. Moreover, the chat-bot interface application 124 allows notification events to be constructed as needed. Accordingly, a user is not required to have knowledge of the SOAP XML commands needed to control the CEBP application 116 in order to make use of that application 116. In addition, the need for an administrator or programmer to customize the CEBP application 116 for a particular enterprise or user can be avoided.

Figure 3:
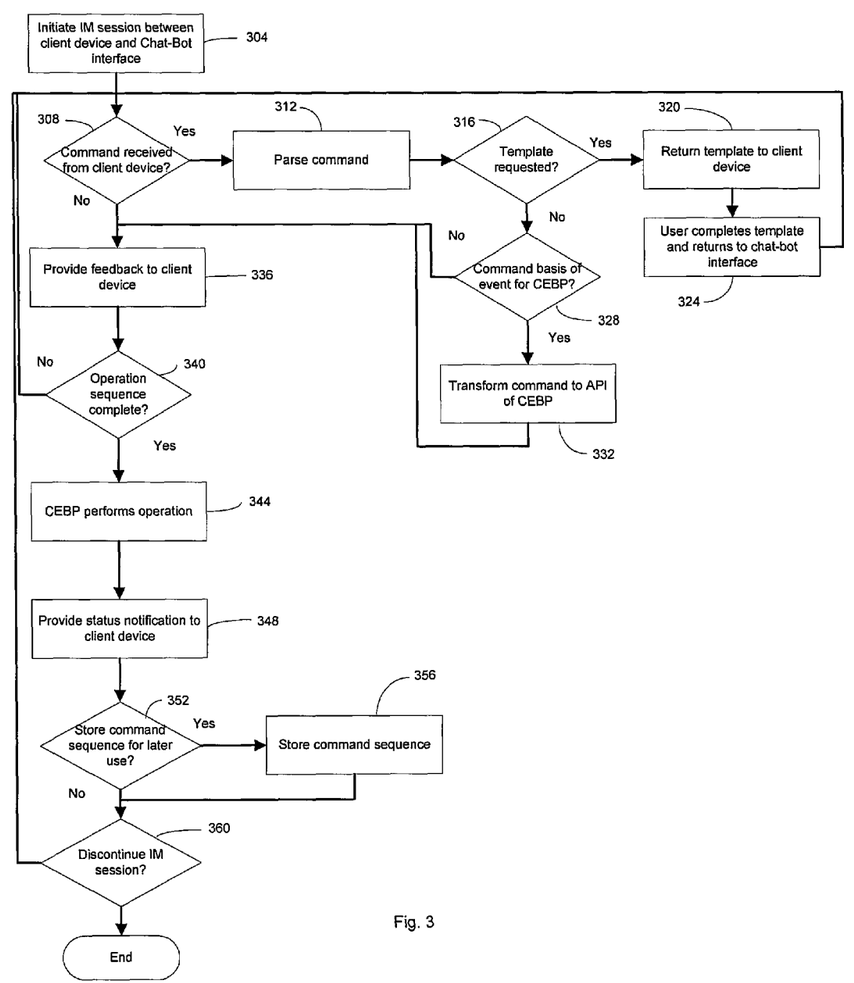
FIG. 3 is a flow chart depicting aspects of the operation of a system incorporating a chat-bot interface to a communication-enabled business process platform in accordance with embodiments of the present invention.

FIG. 3 illustrates aspects of the operation of a chat-bot interface in association with a CEBP application 116 in accordance with embodiments of the present invention. In general, the chat-bot interface may be implemented as a chat-bot interface application 124 executed by a chat-bot interface device 120 comprising an agent, or by another device (e.g., server 104 or client device 108). In making use of the chat-bot interface, an instant messaging session is initiated between the client device 108 of a user and the chat-bot interface 120 or other device running the chat-bot interface application 124 (step 304). In accordance with embodiments of the present invention, the instant messaging session can be initiated by either a user through a client device 108, or the chat-bot interface 120, in response to instructions or data received by the chat-bot interface 120.

Initiation of an instant messaging session generally includes establishing a communication channel between the user's client device 108 and the chat-bot interface 120, via the communication network 112.

At step 308, a determination may be made as to whether a command has been received from the client device 108. In response to receiving a command from a client device 108, the chat-bot interface 120 parses the command (step 312). The command will be entered by the user through a user input 256 associated with the user's client device 108. Moreover, that command is entered using text in compliance with a structured language that complies or corresponds to the commands used to control the CEBP application 116. After parsing the command, the chat-bot interface 120 may then transform the command into the application programming interface (API) of the CEBP application 116 (step 332). In accordance with embodiments of the present invention, this can include transforming a parsed, natural language command, to a SOAP XML message and sending it to the CEBP application 116. Accordingly, the user is not required to provide commands in the API of the CEBP application 116. Instead, the user may interact with the CEBP application 116, via the chat-bot interface 120, using simple, commands and instructions in accordance with a structured language that the user communicates to the CEBP application 116 via instant messaging. Therefore, a user can command the CEBP application 116 to perform operations, without requiring prior customization of the CEBP application and/or interface, and without requiring the user to be conversant in the API of the CEBP application 116.

After determining that a command has not been received from the client device at step 308, or after transforming a command communicated via an instant message to the API of the CEBP application 116 at step 332, feedback may be provided to the client device 108 (step 336). Providing feedback to the client device 108 can comprise providing a natural language report to a user of the client device 108 of the status of that user's interaction with the chat-bot interface 120 and/or the CEBP application 116 via an instant or text message. For example, where a command has not been received from the client device 108, the chat-bot interface 120 may issue a message that is presented to the user through the client device 108, requesting input from the user. Alternatively or in addition, a message from the chat-bot interface 120 to the user can comprise a request that the user specify a type of operation that the user wishes to have the CEBP application 116 perform. This can include posing an open ended question that invites a natural language response from the user. As a further example, where it is determined that a command received from a client device 108 is not the basis of an instruction to the CEBP application 116, the chat-bot interface 120 may provide a message to a client device 108 for delivery to the user that is a follow-up to the earlier command. For example, in response to a command comprising a request by the user that the CEBP application 116 perform a particular operation, the chat-bot interface 120 may issue a request to the user for information comprising parameters that must be supplied to the CEBP application 116 in order to perform the requested operation. As yet another example, where the chat-bot interface 120 has transformed a command received from a user as an instant message to the API of the CEBP application 116, a reply instant message indicating that the instruction or command has been passed to the CEBP application 116 may be provided.

At step 340, a determination may be made as to whether the operation sequence is complete. In general, an operation sequence is complete if an instruction or command has been received from the user and, as transformed into the API of the CEBP application 116 by the chat-bot interface 120, can be acted on by the CEBP application 116. If the operation sequence is not complete, for example additional input is required from the user, the process may return to step 308.

If the operation sequence is complete, the CEBP application 116 can perform the requested operation or a subset of that operation (step 344). An example of a CEBP operation is sending a notification message to indicated recipients. An example of a CEBP operation subset is sending a notification to indicated recipients, to which a response from those recipients is pending. After the CEBP application 116 performs an operation or operation subset, a status notification may be provided to the client device 108 (step 348). The status notification can include a message that is output by the client device 108 to the user, to indicate the status of the CEBP application 116 operation or operation subset. For example, the identities of individuals who have received a notification message and/or responded to a notification message requesting a reply can be provided.

At step 352, a determination may be made as to whether the command sequence that resulted in the operation or operation subset performed by the CEBP process application 116 should be stored for later use. For example, a command or set of commands that resulted in the performance of a CEBP operation can be stored to a favorites list or published to a public directory, and later retrieved for use as part of a recurring notification event. As another example, a stored command or sequence of commands can be retrieved and edited to be suitable for a different notification or other event, operation, or sub-process. If it is determined that the command sequence might be useful in connection with a future event, that command sequence is stored (step 356). The command sequence may be stored as part of or in association with the chat-bot interface 120, or in data storage included in or available to the chat-bot interface 120, a client device 108 and/or the server 104. Moreover, a stored command sequence can be used as the basis for a template for performing a sub-process or a complete operation. The user may instruct the chat-bot interface 120 to store a command sequence using natural language commands provided as part of the instant messaging session with the chat-bot interface 120.

After it has been determined that the command sequence should not be stored for later use, or after storing the command sequence, a determination may be made as to whether the instant messaging session should be discontinued. For example, if the desired CEBP operation has been completed, the user may choose to discontinue the IM session with the chat-bot interface 120. As another example, where a CEBP operation has been initiated but has not been completed (e.g., a large number of recipients are being provided with a notification and/or a response from recipients has been requested) the user may wish to allow the operation to continue without that user's active involvement. As still another example, where a CEBP operation is complete and/or additional input from the user is not required, the chat-bot interface 120 may discontinue the IM session. After discontinuing the IM session, the process may end. If the IM session is not discontinued, the process may return to step 308.

An example interaction in accordance with an embodiment of the present invention is provided below. The dialogue included in this example shows how the chat-bot interface 120 can operate in a CEBP environment, and how a user can access CEBP operations without being conversant in a specialized CEBP application 116 API.

User: "Hello CPM"

CPM: "Hello. What is your authorization code?"

User: "12345678 (user name is the IM user, so only a password/auth code is needed)
CPM: "How can I help you, Jim?"
User: "Send an alert"
CPM: "To whom?"
User: "To Basking Ridge employees"
CPM: "What shall I tell them?"
User: "Say 'All Avaya offices in Basking Ridge will close at 2 PM today due to the snow storm"
CPM: "OK, sending alert with ID 4291"
. . .
User: "Hi"
CPM "How can I help you, Jim?"
User: "What is the status of alert 4291?"
CPM: "412 out of 672 employees have been sent the alert"
CPM: "I'll be done sending the alert in about 2 minutes"
CPM: "Would you like me to tell you when I'm done?"
User: "Yes"
. . .
CPM: "Jim, for alert 4291 all 672 employees have been notified"
CPM: "Is there anything I can do for you, Jim?"
. . .
CPM: "Hello, Jim. I have a message for you from Dennis. Would you like to see it?"
User: "OK"
CPM: "Your presence is requested in a conference call that is taking place now"
CPM: "The subject is 'Citigroup Requirements'"
CPM: "The conference ID is 200420"
CPM: "Would you like to attend this conference call?"
User: "Yes. Please call me at 973-383-9838" (a nearby payphone)
CPM: "OK, calling you now."

In accordance with further embodiments of the present invention, a different parser may be provided for each natural language associated with a grammar or structured language that will be supported by the chat-bot interface 120. In addition, although various examples have been described as involving the use of written messages, other forms of messaging can be used. For example, interactive voice response messages can be used.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for interfacing with a communication system, comprising:
   initiating a natural language instant messaging communication session between a first user communication device and an agent;
   receiving first natural language input from a first user at the first user communication device;
   delivering the received first natural language input from the first user communication device to the agent as part of the instant messaging communication session, wherein the first natural language input is a first command directed to operation of a communication-enabled business process (CEBP);
   receiving the first command input at the agent;
   transforming by the agent the first command into a first CEBP command, wherein the first CEBP command is in an application programming interface of the CEBP;
   delivering the first CEBP command from the agent to the CEBP; and
   providing a first natural language feedback message from the agent to the first user communication device, wherein the first natural language feedback message at least one of: requests additional input from the first user or provides a report of the status of an action taken with respect to the first command, wherein the agent provides an interface function that transforms communications contained in an instant message directed to the communication system to the application programming interface of the communication-enabled business process, and that transforms communications in the application programming interface of the communication-enabled business process to a communication in an instant message directed to the first user communication device, wherein the first CEBP command causes the CEBP to send a notification to a plurality of communication devices using a plurality of communication channels, and wherein addresses of the plurality of communication devices are not specified by the user in the first command.

2. The method of claim 1, wherein the instant message comprises a command in accordance with a structured language, and wherein the agent translates the command into a command in accordance with the application programming interface of the communication-enabled business process to cause the notification to be sent to the plurality of communication devices.

3. The method of claim 2, wherein the first natural language feedback message includes a report of a number of communication devices in the plurality of communication devices that have received the notification.

4. The method of claim 3, wherein the instant messaging communication session is initiated by a first user, and wherein the number of communication devices in the plurality of communication devices that have received the notification is the number of communication devices from which a response has been received.

5. The method of claim 4, further comprising:
   responding by the agent to the initiation of the instant messaging communication session by sending an acknowledgement message to the first user as part of a continuation of the instant messaging communication session, wherein the acknowledgement message is output to the first user by the user communication device.

6. The method of claim 1, wherein the instant messaging communication session is initiated by the agent.

7. The method of claim 6, wherein the instant messaging communication session is initiated by the agent and wherein as part of the instant messaging communication session the first user is sent a first notification message, and wherein subsequent to the first notification message the first user is placed in communication with at least one of a second user and a communication-enabled business process as part of a communication session that is different than the instant messaging communication session.

8. The method of claim 7, wherein the first notification message or a second notification message includes a communication address of the second user, and wherein the first user using a second communication device initiates the communication session that is different than the instant messaging communication session with the second user.

9. The method of claim 1, further comprising:
providing by the first user through the user communication device a second natural language input that is a second command to the agent as part of a continuation of the instant messaging communication session, wherein the second command directs the agent to store a command sequence including at least the first command directed to the operation of the CEBP.

10. The method of claim 9, wherein the command provided to the agent as part of the instant messaging communication session is transformed by the agent from a natural language command to an XML message.

11. The method of claim 4, further comprising:
the CEBP sending a further notification to the communication devices in the plurality of communication devices for which a response has not been received; and
the agent providing information regarding the status of the notification to a plurality of recipients to the first user as part of an instant messaging communication session.

12. The method of claim 1, further comprising:
storing a sequence of commands.

13. A system, comprising:
a communication network;
a server, wherein the server is interconnected to the communication network;
a communication-enabled business process (CEBP) running on the server, wherein the CEBP is operated using a specified application programming interface;
a first agent device, wherein the first agent device is in communication with the server via the communication network;
a chat-bot interface application running on the first agent device; and
a first client device, including:
a user input;
a user output; and
an instant messaging application, wherein the first client device is in communication with the first agent device via the communication network, wherein a user provides commands to the chat-bot interface using instant messages containing network language commands, wherein the chat-bot interface transforms the natural language commands into the specified application programming interface (API) of the CEBP and provides the transformed commands to the CEBP, wherein the transformed CEBP command causes the CEBP to send a message to a plurality of recipient devices, wherein addresses of the plurality of recipient devices are not specified by the user in a natural language command, wherein the CEBP returns a status report in the API of the CEBP regarding the sending of the message, wherein the chat-bot interface transforms the status report into a natural language status report, and wherein the natural language status report is returned to the first client device as an instant message.

14. The system of claim 13, further comprising:
a second client device, wherein the second client device is interconnected to the communication network, wherein in response to a command received by the chat-bot interface from the first client device instructing that a notification event be sent to the second client device the chat-bot interface transforms the command into the application programming interface of the communication-enabled business process, and wherein in response to receiving the transformed command the communication-enabled business process initiates a notification event.

15. The system of claim 14, wherein the communication-enabled business process provides information to the chat-bot interface regarding a status of the notification event in a message in the application programming interface of the communication-enabled business process, wherein the chat-bot interface transforms that message to the natural language of the user, and wherein the message in the natural language of the user is sent to the first client device by the chat-bot interface for output to the user.

16. The system of claim 13, further comprising:
second and third client devices, wherein in response to a command received by the chat-bot interface from the first client device instructing that a notification be sent to the second and third client devices over second and third communication channels the chat-bot interface transforms the command into the application programming interface of the communication-enabled business process, and wherein in response to receiving the transformed command the communication-enabled business process initiates a notification event including the second and third client devices.

17. A system, comprising:
a client device;
a communication application running on the client device;
an agent device;
an interface application including an instant message parser running on the agent device; and
a communication channel, wherein an instant message communication directed to the agent over the communication channel is parsed by the instant message parser to obtain a command formatted according to the application programming interface (API) of a communication-enabled business process (CEBP), wherein the command formatted according to the API of the CEBP is provided to the CEBP by the agent, wherein the communication application takes a specified action in response to the provided command, wherein the specified action includes sending by the CEBP a message to a plurality of recipients, and wherein addresses of the plurality of recipient are not specified by the user in the command.

18. The system of claim 17, wherein the client device is interconnected to the communication channel, wherein the instant message communication is entered by a user of the client device, and wherein the instant message communication is based on a template retrieved by the agent in response to a request by the user.

19. The system of claim 17, further comprising:
data storage, wherein the command comprises a series of commands, and wherein the series of commands are stored for use in a subsequent operation.

* * * * *

UNITED STATES PATENT AND TRADEMARK OFFICE
CERTIFICATE OF CORRECTION

| | | |
|---|---|---|
| PATENT NO. | : 9,043,407 B1 | Page 1 of 1 |
| APPLICATION NO. | : 12/483851 | |
| DATED | : May 26, 2015 | |
| INVENTOR(S) | : David Gaulke and Dennis Kornbluh | |

It is certified that error appears in the above-identified patent and that said Letters Patent is hereby corrected as shown below:

On the title page item 57 at line 9 in the Abstract, please delete "dialog" and replace it with --dialogue-- therein.

Signed and Sealed this

Thirteenth Day of October, 2015

Michelle K. Lee
*Director of the United States Patent and Trademark Office*